June 11, 1957  L. W. GILBERT ET AL  2,795,441
LOW FRICTION ROTARY "O"-RING SEAL
Filed June 29, 1954

INVENTORS
LYNFORD W. GILBERT
WAYNE B. LLOYD

BY

ATTORNEYS

United States Patent Office 2,795,441
Patented June 11, 1957

2,795,441

LOW FRICTION ROTARY O-RING SEAL

Lynford W. Gilbert and Wayne B. Lloyd, Baltimore, Md., assignors, by mesne assignments, to the United States of America as represented by the Secretary of the Navy Application June 29, 1954, Serial No. 440,310

3 Claims. (Cl. 286—11.13)

This invention relates to a rotating joint which utilizes an O-ring for sealing rotating or oscillating shafts against leakage at high pressures with a minimum of friction.

In the prior art use of O-rings in rotating joints, a combination of dimensions and materials were used which gave friction increases at the joint which were proportional to the increases in operating pressure of the system being sealed. As a result, O-rings have rarely been used on rotating joints except in systems operating at low speed and low pressure or where frictional torque was unimportant. When O-rings were used to seal a high speed-high pressure rotating joint the seal friction was prohibitively high at high pressures which resulted in inefficiency and early seal failure. As a result of this, most high performance rotating seals now use a complicated spring-backed metallic slip-ring type of seal which is costly and excessively large for applications where limited space is available.

The present invention overcomes the above described drawbacks of the prior art. An O-ring, made of rubber or other similarly resilient material, is slightly compressed within a chamber which is proximate to the relatively rotating surfaces of two members so that portions of the O-ring abut each of these members and the O-ring provides a seal between them. The O-ring rotates with one of the members and rotates relative to the other member. A fluid duct connects the chamber in which the O-ring is placed with a fluid reservoir which is subject to changing pressures. The changing fluid pressure deforms the O-ring so that as the pressure increases a smaller area of the O-ring contacts the point of relative rotation between the O-ring and one of the members. This increase in fluid pressure also causes the O-ring to exert a correspondingly greater increase of pressure per unit of area on that member. This combination of decrease of area of contact and increase of unit pressure causes the total pressure at the point of relative rotation between the O-ring and one of the members to remain constant. Also since there is greater pressure exerted between the O-ring and the members which it seals when the fluid pressure increases, the tendency for leakage at these higher pressures is lessened. It can therefore be seen the frictional torque between the two relatively rotating surfaces remains constant, that optimum sealing is obtained under all conditions, and that the seal life is prolonged.

It is therefore an object of the instant invention to disclose a system wherein a simple O-ring is utilized as a seal between two relatively rotating members in such a manner that frictional torque between the two members does not change with changes in pressure on one side of the seal provided by the O-ring; and wherein greater sealing pressure per unit of area is obtained between the two members as dictated by increases of pressure within the system.

It is another object of this invention to disclose a sealing system for a rotating joint which is capable of compact installation and inexpensive fabrication.

Other objects and many of the attendant advantages of this invention will be readily appreciated as the same becomes better understood by reference to the following detailed description when considered in connection with the accompanying drawings wherein.

Figure 1:
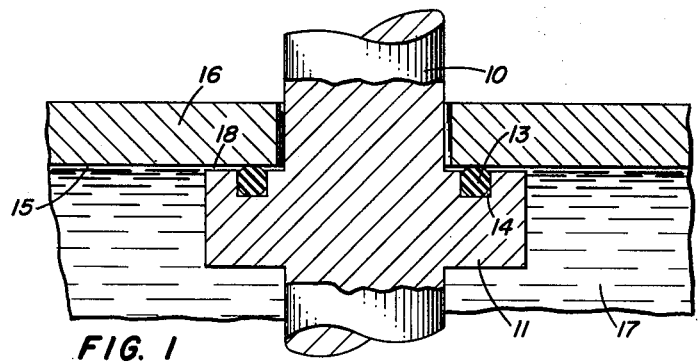
Fig. 1 is a view, partially in cross section of an O-ring in operative sealing relationship to a rotating shaft.
Figure 2:
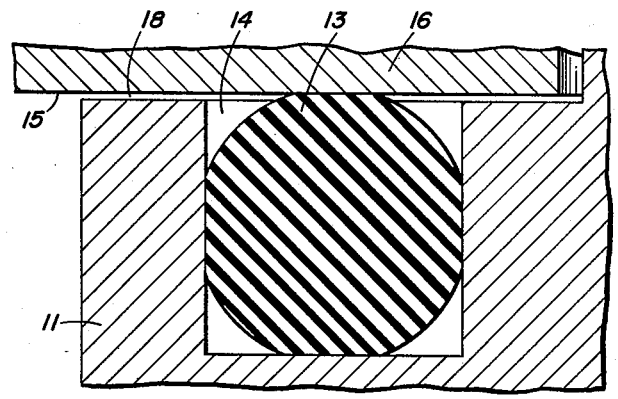
Fig. 2 is an enlarged portion of Fig. 1 which shows the O-ring positioned under normal sealing pressure between two relatively rotating members.
Figure 3:
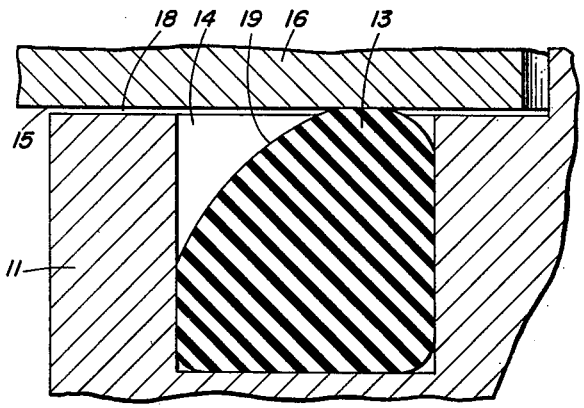
Fig. 3 is an enlarged drawing which shows the deformation of the O-ring when the system which it seals is subjected to greater than normal pressures.

Reference is now made to Fig. 1 wherein numeral 10 depicts a cylindrical shaft which is capable of rotation or oscillation. Hub 11 is formed integrally with shaft 10 and serves the functions of supporting some mechanical element, such as the vane of a rotary actuator (not shown), and for providing space for the installation of O-ring 13. Formed in hub 11 is an annular channel 14, Figs. 2 and 3, of substantially square cross section within which O-ring 13 is adapted to fit. The O-ring 13, after being positioned within channel 14, has a portion thereof in contact with the surface 15 of retaining wall 16 which encloses fluid reservoir 17, the latter being subject to changing pressures. The side of wall 16 which is remote from fluid reservoir 17 is at a substantially constant pressure which is at all times lower than the variable pressure within reservoir 17. Retaining wall 16 can be stationary or can have a rotational movement about the longitudinal axis of shaft 10. The space 18 between hub 11 and retaining wall 16 acts as a duct and allows the variable fluid pressure within reservoir 17 to affect the configuration of O-ring 13. Different fluid pressures will deform O-ring 13 by an amount which is proportional to the fluid pressure. In the initial assembly of the system shown in Figs. 1 and 2, the O-ring 13 seals the system against external leakage because it is squeezed slightly in the axial direction due to the dimensional conditions at assembly.

The system operates to hold rotational friction between O-ring 13 and surface 15 substantially constant. Because of the relatively greater O-ring area in contact with the sides of channel 14 than with surface 15, the O-ring 13 will rotate with hub 11 and relative to surface 15. The dimensions of the channel 14 are such that the O-ring 13 is squeezed both axially and radially, Fig. 2. In operation, increases of fluid pressure in reservoir 17 are applied through space 18 against surface 19 of the O-ring 13, Fig. 3. As the pressure increases the area of contact between O-ring 13 and surface 15 will decrease because the O-ring 13 is forced away from surface 15. However, the contact pressure, that is, pressure per unit of area between O-ring 13 and surface 15 increases with increases of pressure on O-ring surface 19 by virtue of the fact that rubber transmits pressure practically undiminished in all directions in the same manner as an incompressible fluid. The increase in contact pressure combined with the reduction of contact area between O-ring 13 and surface 15 tends toward maintaining the total pressure between these two members substantially constant thus giving low friction at all pressures up to the extrusion point of the O-ring 13. On the other hand as the fluid pressure increases, the increase in contact pressure between the O-ring 13 and surface 15 will cause increased sealing capacity of the rotating seal at high fluid pressures.

The friction between O-ring 13 and surface 15 is further reduced by maintaining the inside diameter of channel 14 equal to or slightly less than the relaxed inside diameter of O-ring 13. This avoids a condition produced by the Joule effect in rubber; that is, the coefficient of friction is lower when the O-ring is relaxed or slightly compressed than when it is under tension.

A material which has been found satisfactory for surface 15 is dense cast iron since it has enough inherent lubricity to prevent O-ring seizure after being motionless for a period of time. It has been found when surface 15 is held between 10–20 microinch, root mean square, optimum results will be obtained.

The dimension requirements for the various components of the system are as follows: The depth of channel 14 should be 90 to 95% of O-ring section diameter. The width of channel 14 should be from 95 to 100% of the O-ring section diameter. The inside diameter of the channel 14 should be from 95 to 100% of the relaxed O-ring inside diameter.

The above described rotating seal is capable of very low "break-out" friction at both low and high pressure; low running friction at both low and high pressure; perfect sealing; compact installation; and is capable of inexpensive fabrication.

Obviously many modifications and variations of the present invention are possible in the light of the above teachings. It is therefore to be understood that within the scope of the appended claims the invention may be practiced otherwise than as specifically described.

What is claimed is:

1. A rotating joint for sealing a rotatable shaft against leakage from a variable pressure reservoir with substantially constant rotational friction at the joint comprising a shaft, a hub formed on said shaft, an annular channel of rectangular cross section formed in said hub concentrically with the axis of said shaft, a retaining wall positioned proximate to said hub, a resilient O-ring positioned within said annular channel and in contact with said retaining wall to seal said shaft against leakage from said variable pressure reservoir, said O-ring being compressed between said hub and said retaining wall, the depth of said channel being from 90 to 95% of the O-ring section diameter, the width of said channel being from 95 to 100% of the O-ring section diameter, the inside diameter of said channel being from 95 to 100% of the relaxed O-ring inside diameter, and duct means connecting said annular channel with said variable pressure reservoir.

2. A rotating joint for sealing a rotatable shaft against leakage from a variable pressure reservoir with substantially constant rotational friction at the joint regardless of changes in pressure within the reservoir comprising a shaft, a hub affixed on said shaft, an annular channel of rectangular cross section formed in said hub concentrically with the axis of said shaft, a retaining wall positioned proximate to said hub, a resilient O-ring compressed within said annular channel and compressed between said channel and said retaining wall, the depth of said channel being from 90 to 95% of the O-ring section diameter, the inside diameter of said channel being from 95 to 100% of the relaxed O-ring inside diameter, and duct means connecting said annular channel with said variable pressure reservoir whereby said O-ring is deformed by an amount which is proportional to the pressure within said reservoir to thereby lessen its area of contact and increase its unit pressure with said retaining wall to maintain the total contact pressure between said O-ring and said retaining wall substantially constant regardless of changes in pressure in said reservoir.

3. A rotating joint for sealing a rotatable shaft against leakage from a variable pressure reservoir with substantially constant rotational friction at the joint regardless of changes in pressure within the reservoir comprising a shaft, a hub formed on said shaft, an annular channel of rectangular cross section formed in said hub concentrically with the axis of said shaft, a retaining wall positioned proximate to said hub, a resilient O-ring positioned in said channel and compressed between said channel and said retaining wall, the depth of said channel being from 90 to 95% of the O-ring section diameter, the inside diameter of said channel being from 95 to 100% of the relaxed O-ring inside diameter, and duct means connecting said annular channel with said variable pressure reservoir whereby said O-ring is capable of being deformed by an amount which is proportional to the pressure within said reservoir to thereby lessen its area of contact and increase its unit pressure with said retaining wall to maintain the total contact pressure between said O-ring and said retaining wall substantially constant regardless of changes in pressure in said reservoir.

References Cited in the file of this patent

UNITED STATES PATENTS

| | | |
|---|---|---|
| 2,365,146 | Wichorek | Dec. 12, 1944 |
| 2,575,549 | Doble | Nov. 20, 1951 |

OTHER REFERENCES

"O-Ring Packings Simplify Lightweight Hydraulic Equipment," Product Engineering, September 1944, pages 581–585. Copy in Div. 52.